United States Patent [19]
Bruckert

[11] Patent Number: 5,128,959
[45] Date of Patent: Jul. 7, 1992

[54] VARIABLE BANDWIDTH CDMA RADIO SYSTEM

[75] Inventor: Eugene J. Bruckert, Arlington Heights, Ill.

[73] Assignee: Motorola, Inc., Schaumburg, Ill.

[21] Appl. No.: 660,192

[22] Filed: Feb. 22, 1991

[51] Int. Cl.$^5$ .............................................. H04L 27/30
[52] U.S. Cl. .................................. 375/1; 380/34; 370/18; 379/59; 455/33.2; 455/67.1
[58] Field of Search ............... 455/33, 38, 67, 53, 455/54; 379/58, 62, 59, 60; 370/18; 375/1; 380/34

[56] References Cited

U.S. PATENT DOCUMENTS

| | | | |
|---|---|---|---|
| 4,575,582 | 3/1986 | Makino | 455/38 |
| 4,703,324 | 10/1987 | White | 455/38 X |
| 4,796,291 | 1/1989 | Makino | 379/58 |
| 4,797,948 | 1/1989 | Milliorn et al. | 455/67 |
| 4,850,033 | 7/1989 | Eizenhöfer et al. | 455/33 X |

*Primary Examiner*—Bernarr E. Gregory
*Attorney, Agent, or Firm*—Jon Christensen

[57] ABSTRACT

A method of identifying a proximal base site of a number of base sites by a communication unit in a CDMA communication system having a number of communication resources. The communication unit identifies the proximal base site by detection and measurement of identification signals received from the base sites where each base site transmits an identification signal containing at least an ID on a communication resource defined by parameters stored within a resource table within a memory unit within the communication unit with such stored parameters including a code key, a bandwidth, and a frequency and wherein at least some resources may be frequency coextensive.

The method includes the steps of selecting a resource from the resource table within the memory of the communication unit and detecting and decoding to produce an ID from a detected identification signal by the communication unit on the resource. The method also includes the step of measuring signal strength by the communication unit of the detected identification signal to produce a magnitude value and storing the value and the ID in a signal strength table within the memory of the communication unit. The communication unit then increments to a next resource within the resource table and repeats the previous steps. The communication unit finally identifies the proximal base site by determining a highest relative signal strength stored within the signal strength table and recovering the ID stored therewith.

10 Claims, 2 Drawing Sheets

5,128,959

VARIABLE BANDWIDTH CDMA RADIO SYSTEM

FIELD OF THE INVENTION

The field of the invention relates to communication system and more specifically to trunked mobile communication systems.

BACKGROUND OF THE INVENTION

Trunked mobile communication systems are known. Such systems typically allocate communication resources (such as a frequency pair or TDM time slot) upon perception of a need for communication services. Such communication resources typically allocated on a 30 KHz bandwidth channel in allocated areas of an assigned frequency spectrum.

In some systems perception of a need for communication services occurs when a mobile communication unit transmits a resource request to a resource controller. In other systems a communication unit simply seizes control of a communication resource and begins transmitting a signal.

In either case the geographical range of a mobile communication unit is limited. The limited range often requires that communication transactions between units, or between a mobile unit and a PSTN subscriber, be supported through central site communication support facilities. Central site communication support facilities (base sites) provide communication support functions within a service coverage area proximal to a base site antenna.

Upon entering the service coverage area of a base site a communication unit may request service through a resource controller that may be located at the base site. The communication unit in desiring service may first search a designated frequency spectrum for a control resource (an uplink) over which to transmit a service request. The communication unit then monitors the resource (a downlink) for a response. Where the control resource consists of a frequency pair the uplink typically consists on the first of the pair and the downlink is the second frequency of the frequency pair.

Upon activation a communication unit searches for a control resource. Upon finding a control resource, on the other hand, the communication unit may wish to determine whether the resource represents the nearest resource controller thereby insuring adequate reception. The communication unit makes this determination by measuring the signal strength of the transmitted signal on the control resource. The communication unit may make such a measurement on a number of frequencies (from differing base sites) before selecting the resource offering the strongest signal, thereby insuring access to the nearest base site.

After transmitting a resource request on an uplink through the nearest resource controller the communication may wait for a response. The resource controller may respond with an information signal identifying a different communication resource over which the communication unit may conduct a communication transaction. Upon receiving such information the communication unit tunes to the assigned frequency and begins communicating.

Subsequent to initiating a communication transaction, and as the transaction continues, a communication unit may move outside the service coverage area of the base site. The communication unit detects such condition by monitoring the signal received from the base site. As the signal level received from the base site exceeds a threshold, the communication unit scans communication resources for a control resource used by another nearby base site. Upon detecting another base site, the communication unit requests a hand-off to the adjacent base site. If a is available within the other system a hand-off may occur, if not, the call may be dropped.

Transimssions between communication units and base sites are, in many systems, under a frequency division multiple access (FDMA) format. Other systems use time division multiplexing (TDM) in conjunction with the FDMA format.

Spread spectrum communication systems are also known. Spread spectrum systems are communication systems with a high inherent degree of resistance to interference from other transmitters. Spread spectrum systems achieve their resistance to interference by transmitting an information signal distributed over a relatively wide frequency bandwidth. Use of the wide bandwidth avoids a total blocking of signals from relatively narrowband interferers present on individual frequencies or limited bands of frequencies.

Two examples of spread spectrum systems are direct sequence spread spectrum systems (DSSS) and frequency hopping. DSSS systems achieve the wide band distribution of a message signal by encoding an information signal with an output from a pseudo random number generator. Frequency hoppers, on the other hand, achieve a distribution of signals through an indexing format.

The pseudo random number generator used by a DSSS system is a digital circuit used to generate a repeating sequence of digital numbers under the control of a code key. The use of a code key allows a receiver having an substantially identical pseudo random number generator as the transmitter, and the appropriate code key, to decode a transmitted signal. Other receivers without the proper codes are unable to decode the signal. Without the proper code, in fact, a receiver may not even by able to detect the presence of the spread spectrum signal.

The inability of a spread spectrum receiver to detect a spread spectrum signal transmitted under a different code key and the immunity of spread spectrum systems to interference are together the greatest asset of the spread spectrum technology. Because of the great immunity of spread spectrum receivers to competing signals relatively large numbers of transmitters and receivers using different code keys can share the same frequency spectrum with relatively little mutual interference but with a significant increase in spectral efficiency resulting from the greater number of users.

Because of the inherent resistance of spread spectrum communication systems to interference a need exists for a way of applying spread spectrum to trunked communication systems. Such a system, on the other hand, must provide a methodology of detecting spread spectrum signals transmitted under a number of different code keys.

SUMMARY OF THE INVENTION

Under one embodiment of the invention, in a CDMA communication system having a number of communication resources within an allocated frequency spectrum, a method is offered of identifying a proximal base site of a number of base sites by a communication unit. The communication unit identifies the proximal base site through detection and measurement of identification signals received from at least some of the number of base sites on the number of communication resources where each of the base sites transmits an identification signal containing at least an ID on a dedicated resource of the number of resources.

Each resources of the number of resources is defined by parameters stored within a resource table in a memory unit within the communication unit and the base sites. The parameters of each resource include a code key of a number of code keys, a bandwidth of a number of bandwidths, and a frequency of a number of frequencies. Some of the resources of the number of resources may be frequency coextensive.

The method of identifying the proximal base site includes the step of selecting a resource from the resource table within the memory unit. The communication unit, upon occasion, detects and decodes an ID within an identification signal on the resource. The signal strength of the detected identification signal is measured by the communication unit to produce a magnitude value. The value and ID are stored in a signal strength table within memory. The communication unit increments to the next resource in the resource table within memory and repeats the previous steps. The communication unit then identifies the proximal base site by determining the highest relative value stored within the signal strength table the recovers the ID stored therewith.

BRIEF DESCRIPTION OF A PREFERRED EMBODIMENT

Figure 3:
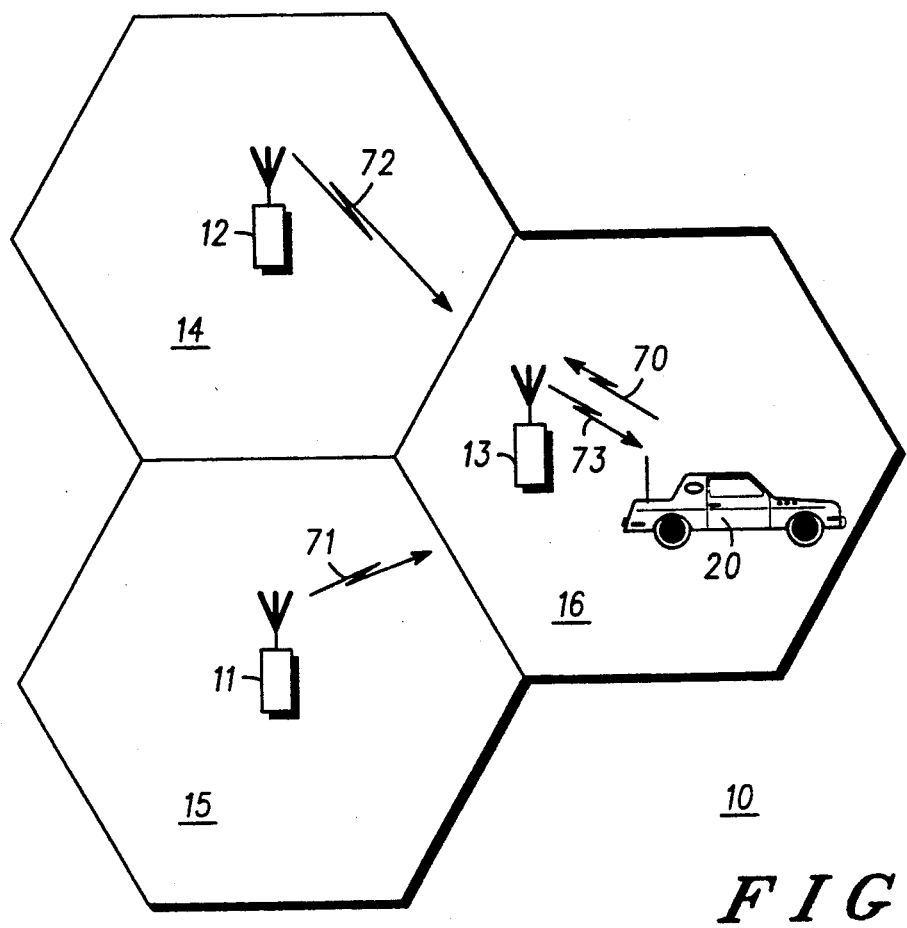
FIG. 3 depicts service coverage areas of three adjacent base sites.

Pursuant to one embodiment of the invention a code division multiple access (CDMA) communication system (10, FIG. 3) is constructed serviced by base sites (11, 12, and 13). A communication unit (20) with such system (10) may request service from and be serviced by any base site (11, 12, or 13) depending on proximity and the ability of the base sites (11, 12, and 13) to detect a signal from the communication unit (20). Each of the base sites (11, 12, and 13) has a service coverage area (depicted by the hexagonal figure (14, 15, and 16) surrounding the base sites (11, 12, and 13) shown in FIG. 3). While a communication unit (20) is within the service coverage area (16) of a base site (13) and desires to initiate a communication transaction the communication unit first scans a set of communication resources to locate a control communication resource used by the base site (13).

Figure 1:
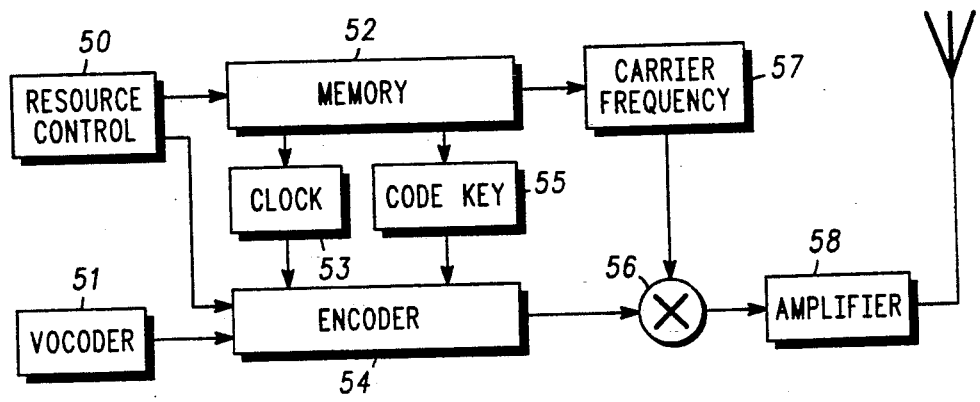
FIG. 1 comprises a block diagram of a base site transmitter.

Shown (FIG. 1) is a block diagram of a base site transmitter (60) shown generally. Include within the transmitter (60) is a vocoder (51), a resource controller circuit (50), a memory (52), a clock (53), a code key (55), an encoder (54), a carrier frequency generator (57), a mixer (56), and an amplifier (58). The resource controller (50) may be a general purpose computer and may have a memory (52) associated with or installed within the resource controller (50). The clock (53) is programmable and a clock output to the encoder (54) is dependent upon a clock speed loaded into the clock from memory (52) under the control of the resource controller (50). The code key (55) is a buffer containing a code loaded from memory (52) also under control of the resource controller (50). The carrier frequency generator (57) is likewise programmable dependent upon a value loaded from memory (52). The encoder (54) together with an input from the code key (55) provides a pseudo random number generator by which a spread spectrum signal may be generated from an input from the vocoder (51) or resource controller (50). The input to the encoder (54) from a vocoder (51) may be a voice signal converted into a data stream within the vocoder (51) or the input to the encoder (54) may be an information signal from the resource controller (50).

Base site transmitters (60) within the base sites (11, 12, and 13) transmit identification signals over a communication resource dedicated to the transmitting base site (11, 12, or 13). A communication resource for purposes of the invention is defined by a code key, a bandwidth, and a carrier frequency (frequency). In the preferred embodiment of the invention a set of code keys are available to each base site (11, 12, and 13) and are listed within a code key table within memory (52). Code keys may be entered into the code key table on startup or otherwise developed through a suitable algorithm.

A set of frequencies defining communication resources may likewise exist within a frequency table within memory. The frequency table may be created upon startup depending on an allocated frequency spectrum (and bandwidth) within which the base is constructed to operate. Also since different, non-interfering spread spectrum signals may be transmitted on the same frequency under different code keys a number of communication resources may be frequency coextensive without mutual interference.

Bandwidth under the preferred embodiment is 1.2 MHz (base bandwidth), or a multiple of 1.2 MHz. (Communication resource under the invention having the same bandwidth will be part of the same group of communication resources.) Bandwidth, as with code keys and frequencies, may be entered within a bandwidth table within the memory unit (52) the bandwidth table, and code key table within memory (52) together comprise a table of communication resources. To accommodate a varying bandwidth (under the CDMA format) a programmable clock (53) is provided within the base site transmitter (50) providing a transmitted signal with a bandwidth as small as the base bandwidth up to a multiple of the base bandwidth.

In some service coverage areas (14, 15, or 16) the base site infrastructure may be constructed to service frequency division multiple access (FDMA) or time division multiple access (TDMA) signals simultaneously with spread spectrum signals. In such a system an available base site bandwidth may be divided up for use under different transmission formats.

As previously mentioned, each base site transmits an identification signal (70, 71, and 72) over a dedicated communication resource also, sometimes, used as a control resource. A control resource, for purposes of the invention, is defined as an RF link used in the two-way exchange of control information between base sites (11, 12, and 13) and communication units (20). In one embodiment of the invention the base sites (11, 12, and 13) and the communication unit (20) exchange control information over the control resource with a spread spectrum signal under a TDM format with two slots per frame. The first slot on a control resource is allocated to base sites for the transmission of identification signals. The second slot is reserved to communication units (20) for the transmission of resource requests.

For purposes of simplicity it will be assumed that each base site (11, 12, and 13) use a first frequency (f1) as a control resource. It will also be assumed that a first base site (11) uses a first code key (C1), a second base site (12) uses a second code key (C2), and a third base site (13) also uses code key (C1). It will also be assumed that base sites one and two (11 and 12) operate with a spread spectrum bandwidth of 2.4 MHz. Base site three (13) will be assumed to be a base site that is required to support FDMA communication transactions simultaneously with spread spectrum transmissions. Base site three (13) will be assumed to operate with a spread spectrum bandwidth of the base bandwidth.

Even through base sites one and three (11 and 13) use the same code key (C1), and frequency, the bandwidths of spread spectrum transmission from base sites one and three (11 and 13) are different (2.4 MHz verses 1.2 MHz). Transmissions from base sites one and three (11 and 13), consequently, do not significantly interfere because base sites one and three (11 and 13) are transmitting on different communication resources.

In operation each base site continuously transmits an identification signal. The identification signal may include an ID of the base site, information of signalling formats, and information on formats under which resource requests may be transmitted to the base site (11, 12, and 13). The identification signal (70, 71, or 72) transmitted by base site transmitter (60) originate as a data signal from within the resource controller (50) and shifted into the encoder (54). The resource controller (50) in base site one (11) programs a clock rate into the clock (53) to produce a 2.4 MHz bandwidth signal and a code key (C1) into the code key buffer (55) through memory (52). The resource controller (50) in base site three (13) likewise programs a clock rate into the clock (53) to produce a 1.2 MHz bandwidth signal and a code key (C1) into the code key buffer (55) through memory (52).

Upon programming the clock (53) and code key buffer (55) by the resource controller an identification signal shifted into the encoder (54) is spread over a 2.4 MHz bandwidth for base sites 11 and 12 or 1.2 MHz for base site 13. The signal is then shifted by a carrier frequency (f1) within mixer (56), amplified (58), and transmitted as an identification signal (70, 71, and 72) unique to the base site from which it orginated (11, 12, or 13).

Figure 2:
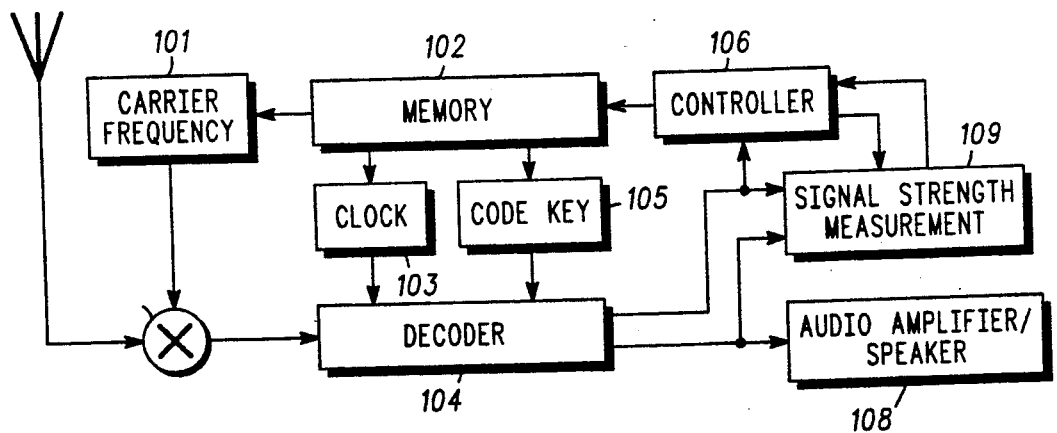
FIG. 2 comprises a block diagram of a communication unit receiver.

Shown (FIG. 2) is a block diagram of a receiver (100) within the communication unit (20). Shown within the diagram (FIG. 2) is a carrier frequency generator (101), memory (102), a clock (103), code key buffer (105), decoder (104), controller (106), a signal strength measurement device (109), and an audio amplifier/speaker unit (107). The blocks shown in the receiver n100) have a similar functionality as the transmitter. The carrier frequency generator (101) shifts a received spread spectrum signal to a zero IF level within a mixer (108). A second pseudo random number generator (decoder (104), clock (103), and code key buffer (105) decode a received (zero-IF) spread spectrum signal and provides an output to the controller (106) or to an audio output (107) and the signal strength measurement device (109).

To detect an identification signal (70, 71, or 72) a receiver (100) must sequence through a table of communication resources incrementing to a next resource within the resource table within memory (102) testing on each resource for a received identification signal before incrementing to the next communication resource within the resource table. Upon detecting an identification signal (70, 71, or 72) the controller (106) causes a signal strength measurement to be taken by the signal strength measurement device (109). A signal strength magnitude is then stored within a signal strength table within memory (102). A measurement of signal strength is performed whenever an identification signal is detected on each communication resource listed within the table of communication resources within memory (102). A request for communication access is then transmitted to a proximal base site base upon the highest relative value of signal strength magnitude stored within the signal strength table within memory (102).

Stored within the signal strength table, in addition to signal strength magnitude, are parameters defnding the communication resource (control resource) of the proximal base site. In the example shown (FIG. 3) the closest base site (13) to the communication unit (20) would be identified as the proximate base site through signal strength measurements. The stored parameters in the example would include a code key (C1), a frequency (f1) and bandwidth (base bandwidth) used by the base site (13).

Stored parameters may also include information on transmission of resource requests (resource request channel) to the proximal base site. Information within the identification signal may include instructions to the communication unit for transmitting resource requests such as transmitting on the dedicated resource of the proximal base site in the second slot under a TDM format or may include an ID of another resource used by the proximal base site for receipt of resource requests.

Upon identification of the proximal base site (13) the communication unit (20) transmits a resource request (73) to the base site (13) which request is acknowledged and a resource granted upon a resource allocated for use by that base site (13). The resource granted may have a frequency (f2), a bandwidth (base bandwidth), and a code key (C3).

Figure 4:
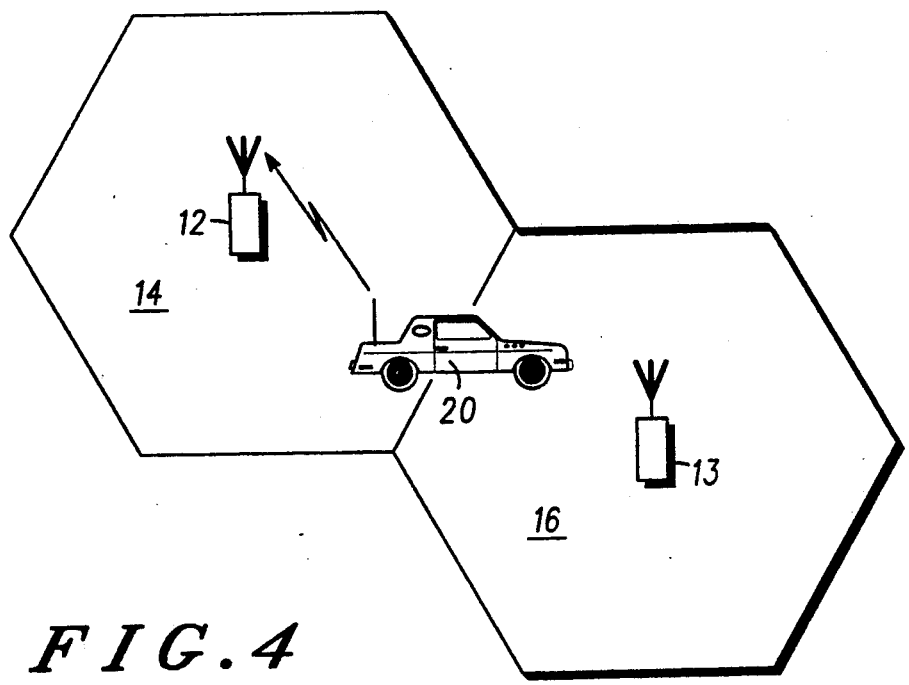
FIG. 4 depicts a communication unit passing from a first service coverage area to a second.

The communication unit tunes to the allocated resource and begins transmitting a communicated signal. As the communications transaction continues through the home base site (13), the communication unit (20) may move to the edge, or outside, the service coverage area (16) of base site (13) (FIG. 4). As the communication unit (20) reaches the edge of the service coverage area (16) such movement must be detected and the transaction handed off to a nearby base site or the transaction will be lost. Detection of movement may occur through signal strength measurements performed by the home base site (13) or by the communication unit (20). Handoff, likewise, may be initiated by the home base site (13) or by the communication unit (13).

In one embodiment of the invention the communiaction unit (20) detects such movement through signal strength measurements of an audio signal received through the base site (13) and performed within the communication unit (100) by the signal strength measurement device (109). As the measured signal strength measured by the signal measurement device (109) exceeds a threshold the communication unit seeks a second proximal base site (12).

The communication unit detects the second proximal base site (12) by again indexing through the table of communication resource measuring detected identification signals. Upon detection (by a determination of highest relative signal strength stored within the signal strength table) of a second proximal base site (12) the communication unit transmits a shared access request on the resource request channel of the second proximal base site (12). The shared access request contains an information signal requesting that the second proximal base site (12) provide simultaneous access to the communication transaction then being served through the first proximal base site (13) on the same resouce.

Since the first base site (13) may operate on the base bandwidth and the second base site (12) may operate on a multiple of the base bandwidth the resource requested through the second base site (12) is specific in content. The resource request transmitted to the second base site (12) requests service the second base site (12) on the communication resource defined by frequency f2, with a base bandwidth, and under code key C3.

Upon receipt of the request at the second base site (12), the second base site (12) grants access on the communication resource defined by frequency f2, with the base bandwidth, and under code key C3. The communication transaction is then, for a time, simultaneously supported from both base sites (12 and 13).

As the communication transaction continues signal strength measurement devices (not shown) at base sites (12 and 13) monitor the signal received from the communication unit (20). At an appropriate signal level (second threshold), and as the communication unit (20) passes into the service coverage area (14) of the second base site (12) the declining signal level detected by base site (13) decreases below the second threshold and simultaneous service may be discontinued.

After service is discontinued from the original home base site (13) the new proximal base site (12) may transmit instructions to the communication unit (20) assigning a new resource of a wider bandwidth, or, different frequency (f3, two times base bandwidth, and code key C4). Such a re-assignment may be consistent with signal quality parameters within the service coverage area (14). The resource re-assignment also preserves adequate resource availability in the original home base site (13).

If after re-assigning a new communication resource to the communication unit (20) communication unit (20) should now move back into the original service coverage area (16) of the original base site (13) then the process must be reversed. Upon detecting the deteriorating signal level from the second base site (12) the communication unit (20) scans for another proximal base site. The nearest base site detected (13) in this case is the original base site (13). In detecting and identifying the new proximal base site (13) the communication unit (20) now detects that the new proximal base site (through receipt and decoding the identification signal) has a narrower bandwidth than the base site (12) currently supporting the communication transaction.

Before transmitting a shared access request to the new proximal base site (13) the communication unit must first transmit a request to the current base site (12) requesting a resource of the same bandwidth of the new proximal base site (13). The current base site acknowledges the request with a resource allocation. The communication unit then transmits a resource request to the new proximal base site (12) in the form of a shared access request on the resouce then in use with the current base site (12). As before, when the communication unit passes entirely into the service coverage area (16) of the new proximal base site (13), service through the previous base site (12) is terminated.

In above embodiment of the invention a resource table is created within memory of the communication unit containing in sequence, every combination of code keys, frequencies, and bandwidths. In the process of detecting identification signals from base sites a communication unit (20) increments through the resource table testing each resource for the presence of an identification signal.

In another embodiment of the invention the controller (106) identifies resources based upon an algorithm using base bandwidth. In the above described example containing base sites (11, 12, and 13) where base site (13) operates with a base bandwidth and the base sites (11, 12 and 13) operate within an allocated frequency spectrum having a highest and lowest frequency the controller (106) begins searching for identification signals (70, 71, or 72) at the lowest frequency and the base bandwidth. The algorithm identifying such parameters requires as an input a base bandwidth, and a lowest and highest frequency of an allocated frequency spectrum.

The controller (106) identifies a lowest frequency as being one-half base bandwidth above the lowest frequency in the allocated frequency spectrum. The controller (106) then tests the lowest frequency of a first group of resources at the lowest (first) frequency, the base bandwidth, and a first code key within the code key table. The controller (106) tests subsequent resources by incrementing through the code key table testing each resource in sequence.

Upon reaching the end of the code key table the resource controller increments to a second frequency, one base bandwidth above the first frequency, and tests again with the base bandwidth and each code key within the code key table. Upon reaching the end of the code key table the process repeats up to a highest frequency equal to one-half base bandwidth below the highest frequency in the allocated frequency spectrum.

Upon reaching the highest frequency in the allocated frequency spectrum the resource controller increments to a second group of communication resources and again tests for an identification signal. The resource controller identifies the first frequency in the second group of communication resources by doubling the base bandwidth (subsequent bandwidth) and calculating a first frequency for the second group of resources as above. The resource controller then tests each resource in the second group of resources using each code key as above up to a highest frequency in the second group determined as for the first group.

The resource controller repeats the process of testing subsequent groups of communication resources up to a bandwidth that substantially equals the allocated frequency spectrum. Upon reaching a bandwidth equaling the frequency spectrum the resource controller then selects the resource for use having the highest relative signal strength magnitude.

In another embodiments of the invention a control resource within CDMA base sites is provided at a base bandwidth and at the lowest frequency within the allocated frequency spectrum. Different code keys are provided to minimize mutual interference.

What is claimed is:

1. In a CDMA communication system having a plurality of communication resources within an allocated frequency spectrum, a method of identifying a proximal base site of a plurality of base sites by a communication unit through detection and measurement of identification signals received from at least some of the plurality of base sites on the plurality of communication resources where each base site transmits an identification signal containing at least an ID on a dedicated resource of the plurality of resources with each resource of the plurality of resources defined by parameters stored within a resource table in a memory unit with the communication unit and base sites with such stored parameters of each resource including a code key of a plurality of code keys, a bandwidth of a plurality of bandwidths, and a frequency of a plurality of frequencies and where at least some resources of the plurality of resources may, be frequency coextensive, such method including the steps of:

A) selecting a resource from the resource table within the memory of the communication unit;
  B) detecting, and decoding to produce an ID from a detected identification signal by the communication unit on the resource;
  C) measuring signal strength by the communication unit of the detected identification signal to produce a magnitude value and storing the value and the ID in a signal strength table within the memory of the communication unit;
  D) incrementing to a next resource within the resource table;
  E) repeating setps A-D with remaining resources within the resource table;
  F) identifying the proximal base site by determining a highest relative signal strength value stored within the signal strength table and recovering the ID stored therewith.

2. The method as in claim 1 further including the step of selecting a communication resource by application of an algorithm for identifying communication resources between a lowest and a highest frequency in an allocated spectrum using a multiple of a base bandwidth and a code key table.

3. In a CDMA communication system having a plurality of comunication resources within an allocated frequency spectrum, an apparatus for identifying a proximal base site of a plurality of base sites by a communication unit through detection and measurement of identification signals received from at least some of the plurality of base sites on the plurality of communication resources where each base site transmits an identification signal containing at least an ID on a dedicated resource of the plurality of resources with each resource of the plurality of resources defined by parameters stored within a resource table in a memory unit within the communication unit and base sites with such stored parameters of each resource including a code key of a plurality of code keys, a bandwidth of a plurality of bandwidths, and a frequency of a plurality of frequencies and where at least some resources of the plurality of resources may, be frequency coextensive, such apparatus comprising A) means for selecting a resource from the resource table within the memory of the communication unit;
  B) means for detecting, and decoding to produce an ID from a detected identification signal by the communication unit on the resource;
  C) means for measuring signal strength by the communication unit of the detected identification signal to produce a magnitude value and storing the value and the ID in a signal strength table within the memory of the communication unit;
  D) means for incrementing to a next resource within the resource table;
  E) means for repeating steps A-D with remaining resources within the resource table
  F) means for identifying the proximal base site by determining a highest relative signal strength value stored within the signal strength table and recovering the ID stored therewith.

4. The apparatus as in claim 3 further including means for identifying communication resources between a lowest and a highest frequency in an allocated spectrum using a multiple of a base bandwidth and a code key table.

5. In a CDMA communication system having a plurality of communication resources within an allocated frequency spectrum having a lowest and a highest frequency, a plurality of base sites having transmitters, at least one of which transmits an identification signal on a communication resource of the plurality of communication resources for the benefit of an at least one communication unit for identification of a proximal base site through detection of the identification signal, with the plurality of communication resources having an at least first group of communication resources defined by a plurality of code keys, a group bandwidth, with the first group bandwidth defined to be a base bandwidth and subsequent group bandwidth to be twice previous group bandwidth, and an at least first frequency group, with the first frequency in each group being one-half group bandwidth above the lowest frequency of the allocated frequency spectrum and remaining group frequencies in incremental steps of one group bandwidth above the first frequency in the group up to a frequency one-half group bandwith below the highest frequency in the allocated spectrum, a method of identifying a proximal base site of the plurality of base sites by the at least one communication unit, such method including the steps of:

A) selecting a resource having a lowest frequency and narrowest group bandwidth in the at least first group of communication resources from a resource table within a memory unit within communication unit;
  B) decoding the information signal by the communication unit using a code key of the plurality of code keys entered into a code key table within the memory;
  C) measuring signal strength and storing magnitude in a proximal base site storage table within the memory upon detection of the information signal;
  D) incrementing code keyws within the code key table;
  E) repeating steps B through the present step with the remaining code key within the code key table;
  F) incrementing to the next comunication resource wihtin the at least first group of communication resources within the at least first group of communication resources;
  G) repeating steps B through the present step until the group bandwidth equals the allocated frequency spectrum; and,
  H) identifying the communication resource within the proximate base site storage table having the highest relative strength measurement magnitude as from the proximal base site.

6. The method as in claim 5 further including the step of selecting a communication resource by application of an algorithm for identifying communication resources between a lowest and a highest frequency in an allocated spectrum using a mulitple of a base bandwidth and a code key table.

7. In a CDMA communication system having a plurality of communication resources within a allocated frequency spectrum having a lowest and a highest frequency, a plurality of base sites having transmitters, at least one of which transmits an identification signal on a communication resource of the plurality of communication resources for the benefit of an at least one communication unit for identification of a proximal base site through detection of the identification signal, with the plurality of communication resources having an at least first group of communication resources defined by a plurality of code keys, of group bandwidth, with the first group bandwidth defined to be a base bandwidth and subsequent group bandwidth to be twice previous group bandwidth, and an at least first frequency group, with the first frequency in each group being one-half group bandwidth above the lowest frequency of the allocated frequency spectrum and remaining group frequencies in incremental steps of one group bandwidth above the first frequency in the group up to a frequency one-half group bandwidth below the highest frequency in the allocated spectrum, an apparatus for identifying a proximal base site of the plurality of base sites by the at least one communication unit, such apparatus comprising:
- A) means for selecting a resource having a lowest frequency and narrowest group bandwidth in the at least first group of communication resource from a resource table within a memory unit within the communication unit;
- B) means for decoding the information signal by the communication unit using a code key of the plurality of code keys entered into a code key table within the memory;
- C) means for measuring signal strength and storing magnitude in a proximal base site storage table within the memory upon detection of the information signal;
- D) means for incrementing code keys within the code key table;
- E) means for repeating steps B through the present step with the remaining code keys within the code key table;
- F) means for incrementing to the next communication resource within the at least first group of communication resources;
- G) means for repeating steps B through the present step until the group bandwidth equals the allocated frequency spectrum; and,
- H) means for identifying the communication resource within the proximate base site storage table having the highest relative strength measurement magnitude as from the proximal base site.

8. The apparatus as in claim 7 further including means for identifying communication resources between a lowest and a highest frequency in an allocated spectrum using a multiple of base bandwidth and a code key table.

9. In a CDMA communication system having a plurality of communication resources within an allocated frequency spectrum a plurality of base sites having transmitters, at least one of which transmits an identification signal on a communication resource of the plurality of communication resources for the benefit of an at least one communication unit for identification of a proximal base site for hand-off of a communication transaction on a home resource from a home base site to the proximal base site through detection of the identification signal from the proximal base site, with the plurality of communication resources having an at least first group of resources defined by a plurality of code keys, an at least first group bandwidth and an at least first group of frequencies, a method for achieving hand-off between base sites having a plurality of bandwidths, such method including the steps of:
- A) identifying a proximal base site having a group bandwidth through a suitable algorithm comparing signal strengths;
- B) comparing home base site signal bandwidth with the group bandwidth of the proximal base site and, upon occasion, determining that the home site bandwidth is larger than proximal base site group bandwidth and transmitting a request to a home site resource controller requesting the home site bandwidth be reduced to the proximal base site group bandwidth thereby defining a new home resource; and
- C) achieving hand-off by transmitting a resource request to the proximal base site requesting access to the communication transaction through the proximate base site on the home communication resource.

10. In a CDMA communication system having a plurality of communication resources within an allocated frequency spectrum, a plurality of base sites having transmitters, at least one of which transmits an identification signal on a commmunication resource of the plurality of communication resources for the benefit of an at least one communication unit for identification of a proximal base site for hand-off of a communication transaction on a home resource from a home base site to the proximal base site through detection of the identification signal from the proximal base site, with the plurality of communication resources having an at least first group of resources defined by a plurality of code keys, an at least first group bandwidth and an at least first group of frequencies, an apparatus for achieving hand-off between base sites having a plurality of bandwidths, such apparatus comprising:
- A) means for identifying a proximal base site having a group bandwidth through a suitable algorithm comparing signal strengths;
- B) means for comparing home base site signal bandwidth with the group bandwidth of the proximal base site and, upon occasion, determining that the home site bandwidth is larger than proximal base site group bandwidth and transmitting a request to a home site resource controller requesting the home site bandwidth be reduced to the proximal base site group bandwidth thereby defining a new home resource; and
- C) means for achieving hand-off by transmitting a resource request to the proximal base site requesting access to the communication transaction through the proximate base site on the home communication resource

* * * * *